Nov. 17, 1959  A. R. CLARK  2,912,832
COOLING APPARATUS FOR VEHICLE SEATS
Filed May 31, 1956
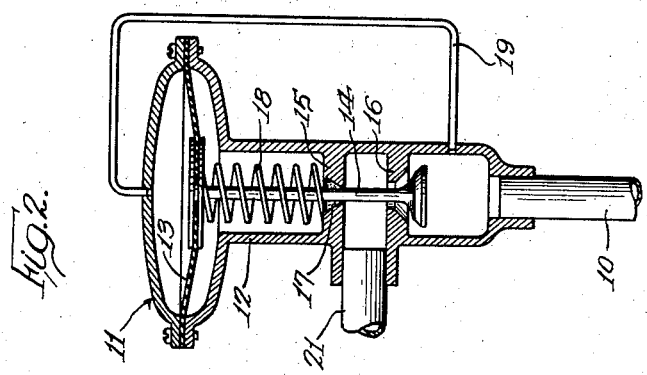
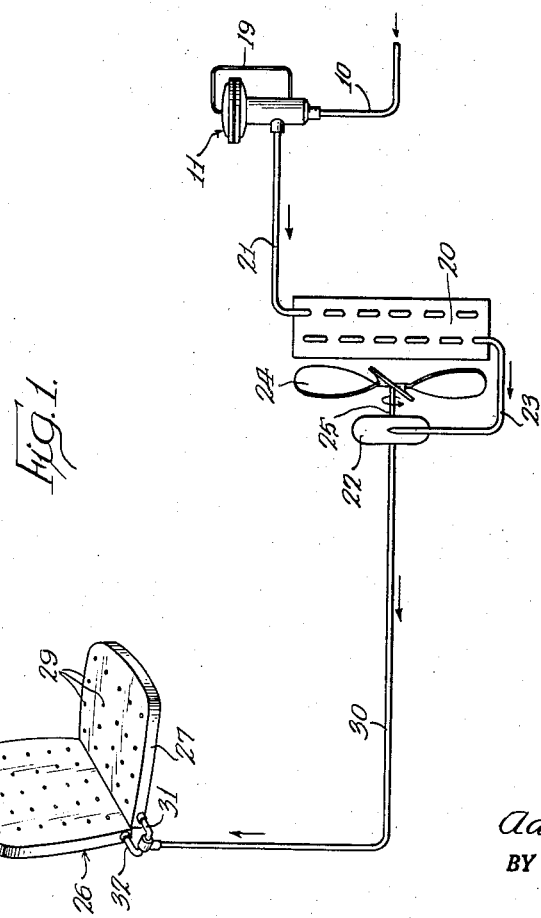
INVENTOR.
Adna R. Clark
BY Paul O. Pippel
Atty.

United States Patent Office 2,912,832
Patented Nov. 17, 1959

2,912,832

COOLING APPARATUS FOR VEHICLE SEATS

Adna R. Clark, Clarendon Hills, Ill., assignor to International Harvester Company, a corporation of New Jersey Application May 31, 1956, Serial No. 588,339

2 Claims. (Cl. 62—172)

This invention relates to cooling apparatus for vehicles and is primarily concerned with a cooling apparatus wherein cool air is passed through the vehicle seat onto the body of the operator of the vehicle.

An object of the invention is to provide a cooling apparatus for a vehicle wherein cool air is passed from the seat onto the body of the operator of the vehicle so as to give cooling comfort to the operator even though the vehicle is of the open type.

Another object of the invention is to provide a cooling apparatus for a vehicle wherein an auxiliary source of compressed air is not required for the operation of the cooling apparatus.

A further object of the invention is to provide a cooling apparatus for a vehicle wherein a limited supply of air is in direct contact with the operator of the vehicle.

The foregoing and other objects of the invention will be apparent from the construction and arrangement illustrated in the accompanying drawing wherein:

Figure 1 is a schematic view of the cooling apparatus of the present invention, and Figure 2 is a vertical sectional view through the pressure responsive valve of the cooling apparatus.

On hot summer days the operator of a tractor on a farm or the operator of a crawler tractor when engaged in earth moving operations or the operator of a highway truck transporting materials between different locations will feel uncomfortable while performing his work due to the heat. The invention proposes a cooling apparatus for the seats of self-propelled vehicles so that the operator of the vehicle may work in comfort. A pressure responsive valve is in communication with a source of compressed air and a heat exchanger is in communication with the pressure responsive valve. An air motor is in communication with the heat exchanger and a fan is disposed between the heat exchanger and the air motor and is operatively connected to the air motor so as to be rotated thereby. The air motor is in communication with the cushion and back of the seat and both the cushion and the back are provided with perforations. The source of compressed air is that which operates the air brake system of the tractor or highway truck. When the air pressure supply has sufficient pressure to cause opening of the pressure responsive valve the surplus compressed air passes into the heat exchanger where the heat of compression is dissipated into the ambient air being forced through the heat exchanger by the fan. The compressed air leaving the heat exchanger passes into an air motor where it is expanded and heat energy of the air is converted to mechanical energy to drive the fan thereby lowering the temperature of the air motor exhaust air. This low temperature exhaust air passes into the cushion and back of the seat and out through the perforations in the cushion and back onto the body of the operator. When the air supply falls below a predetermined pressure the pressure responsive valve closes thus rendering the cooling apparatus inoperative so as to conserve sufficient pressure for safe operation of the vehicle. The cooling apparatus of the present invention provides comfort for the operator of the vehicle even though the vehicle is of the open type, that is, one without a cab. Another feature of the present invention is that the cooling apparatus uses the same source of compressed air as the air brake system of the vehicle and therefore an auxiliary source of compressed air is not required to operate the cooling apparatus. Another feature of the invention is that the limited supply of air is in direct contact with the operator. Another feature of the invention is that the cooling apparatus as a whole has a low cost.

The invention is for use on a self-propelled vehicle such as a tractor or a highway truck. A source of compressed fluid in the form of compressed air is used and this source is the air brake system on the tractor or highway truck. In the drawings, a conduit 10 is in communication with the source of compressed air and a pressure responsive valve unit 11 is in communication with the conduit. The pressure responsive valve unit 11 is comprised of a housing 12 and a circular flexible diaphragm 13 has its edges bolted between two portions of the housing 12. A valve plunger 14 has a stem and a disk integral with the stem and the free end of the stem is fixedly secured to the diaphragm 13. A horizontal wall 15 is made integral with the housing 12 and this wall is provided with an opening which gradually decreases in diameter from the upper face of the opening to the lower face thereof. The valve stem 14 with its head and the wall 16 with its opening comprise a valve, whereas the housing 12, the diaphragm 13 and spring 18 constitute pressure responsive means for controlling such valve. Another horizontal wall 16 is spaced below the wall 15 and is made integral with the housing 12 and the wall has a circular opening formed as shown in Figure 2. The stem of the valve plunger 14 extends through the openings in the walls 15 and 16 and a packing gland 17 is mounted in the opening in the wall 15. A coil spring 18 is disposed on the stem of the valve plunger 14 and bears against the wall 15 and the diaphragm 13. A conduit 19 has one end in communication with the housing 12 below the disk of the valve plunger 14 and has its other end in communication with the upper portion of the housing. A heat exchanger 20 is provided and this heat exchanger is of a standard fin and tube construction. A conduit 21 has one end in communication with the housing 12 and is disposed between the walls 15 and 16 of the housing and is secured to the housing and the other end of the conduit is in communication with and is secured to the heat exchanger 20. An air motor 22 is provided and a conduit 23 has one end in communication with and is secured to the heat exchanger 20 and has its other end in communication with and secured to the air motor. A fan 24 is disposed between the heat exchanger 20 and the air motor 22 and a horizontal shaft 25 is fixedly secured to the fan and extends into and is connected to the air motor so that the air motor may be used to rotate the fan. An auxiliary seat 26 is mounted on the usual seat on the tractor or highway truck and the seat has a cushion 27 and a back 28 and both the cushion and the back are provided with perforations 29. A conduit 30 has one end in communication with and is secured to the air motor 22 and branch conduits 31 and 32 are connected to the other end of the conduit 30 and these branch conduits are in communication with and secured to the cushion 27 and back 28 of the seat respectively.

The operation of the cooling system is as follows: Air from the source of compressed air flows into the conduit 10 and also into the conduit 19 so that it exerts pressure against the diaphragm 13 urging the valve plunger 14 downwardly so as to move the disk downwardly from the opening in wall 16 and open the valve and the coil spring 18 urges the valve plunger upwardly thus urging the disk upwardly into the opening in wall 16 to close the valve. When the air pressure supply has sufficient pressure to cause opening of the valve unit 11 the surplus compressed air passes through the conduit 21 to the heat exchanger 20 where the heat of compression will be dissipated into the ambient air being forced through the heat exchanger by the fan 24. The compressed air leaving the heat exchanger 20 passes through the conduit 23 to the air motor 22 where it is expanded and heat energy of the air is converted to mechanical energy to drive the fan 24 thereby lowering the temperature of the air motor exhaust air. This low temperature exhaust air then passes through the conduit 30 and into conduits 31 and 32 to the cushion 27 and back rest 28 of the seat and the cool air flows out the perforations in the cushion and back rest onto the body of the operator of the vehicle. The valve of unit 11 will be closed by the coil spring 18 when the air supply falls below a predetermined pressure thus rendering the cooling system inoperative so as to conserve sufficient pressure for safe operation of the vehicle.

From the foregoing it will be seen that there has been provided a cooling apparatus for the seats of vehicles so that the operator of the vehicle can work in comfort on hot days.

What is claimed is:

1. A cooling apparatus for a motor vehicle comprising a pressure responsive valve unit in communication with a source of compressed fluid used for operating other equipment on the vehicle, a heat exchanger, a first conduit having one end in communication with the pressure responsive valve unit and having its other end in communication with the heat exchanger, said valve unit including a valve and means responsive to the fluid pressure at said source to control said valve for establishing communication between said source and the first conduit when the source pressure is above a certain pressure and for disrupting such communication when the source pressure drops below such certain pressure, a fluid motor, a second conduit having one end in communication with the heat exchanger and having its other end in communication with the fluid motor, a fan disposed between the heat exchanger and the fluid motor and operatively connected to the fluid motor so as to be rotated thereby, a seat having a cushion and a back and the cushion and the back being provided with perforations, and a third conduit having one end in communication with the fluid motor and having its other end in communication with the cushion and back of the seat, upon the fluid supply from the source falling below said certain pressure the pressure responsive valve unit being actuated to stop flow of fluid to the first conduit rendering the cooling apparatus inoperative so as to conserve sufficient pressure for the safe operation of the vehicle.

2. A cooling apparatus for a seat of a motor vehicle comprising a pressure responsive valve unit in communication with a source of compressed air used for operating other equipment on the vehicle, a heat exchanger, a first conduit having one end in communication with the pressure responsive valve unit and having its other end in communication with the heat exchanger, said valve unit including a valve and means responsive to the air pressure at said source to control the valve for establishing communication between said source and the first conduit when the source is above a certain pressure and for disrupting such communication when the source pressure drops below such certain pressure, an air motor, a second conduit having one end in communication with the heat exchanger and having its other end in communication with the air motor, a fan disposed between the heat exchanger and the air motor and operatively connected to the air motor so as to be rotated thereby, a cushion and a back connected together and the cushion and the back being provided with perforations and adapted to be placed upon the seat of the motor vehicle, and a third conduit having one end in communication with the air motor and having its other end in communication with the cushion and back of the seat, upon the air supply from the source falling below said certain pressure the pressure responsive valve unit being actuated to stop flow of air to the first conduit rendering the cooling apparatus inoperative so as to conserve sufficient pressure for the safe operation of the vehicle.

References Cited in the file of this patent

UNITED STATES PATENTS

| | | |
|---|---|---|
| 2,022,959 | Gordon | Dec. 3, 1935 |
| 2,158,801 | Petterson | May 16, 1939 |
| 2,380,386 | Crawford | July 31, 1945 |
| 2,391,838 | Kleinhans et al. | Dec. 25, 1945 |
| 2,518,246 | Morris | Aug. 8, 1950 |
| 2,666,568 | Alexander | Jan. 19, 1954 |
| 2,791,956 | Guest | May 14, 1957 |
| 2,800,370 | Whitney | July 23, 1957 |